United States Patent [19]

Kawaguchi et al.

[11] Patent Number: 5,314,736
[45] Date of Patent: May 24, 1994

[54] POLYETHYLENE TEREPHTHALATE FILM FOR MAGNETIC RECORDING MEDIUM CONTAINING THREE DIFFERENT KINDS OF PARTICLES

[75] Inventors: Chikakazu Kawaguchi, Atsugi; Yoshio Meguro, Machida; Takashi Harada, Yokohama, all of Japan

[73] Assignee: Diafoil Hoechst Co., Ltd., Tokyo, Japan

[21] Appl. No.: 838,665

[22] Filed: Feb. 21, 1992

[30] Foreign Application Priority Data

Feb. 22, 1991 [JP] Japan ................... 3-28645

[51] Int. Cl.$^5$ ............................. D07N 7/04
[52] U.S. Cl. ................... 428/143; 428/327; 428/329; 428/331; 428/482; 428/900
[58] Field of Search ............ 428/329, 327, 331, 480, 428/482, 900, 143

[56] References Cited

U.S. PATENT DOCUMENTS

| | | | |
|---|---|---|---|
| 4,568,616 | 2/1986 | Seifried et al. | 428/480 |
| 4,639,389 | 1/1987 | Nishimatsu et al. | 428/141 |
| 4,720,412 | 1/1988 | Katoh et al. | 428/141 |
| 4,767,657 | 8/1988 | Sakamoto et al. | 428/143 |
| 4,818,581 | 4/1989 | Katoh et al. | 428/143 |
| 4,865,898 | 9/1989 | Fukuda et al. | 428/141 |
| 5,085,915 | 2/1992 | Taga et al. | 428/141 |
| 5,096,773 | 3/1992 | Sakamoto | 428/323 |

FOREIGN PATENT DOCUMENTS 0345644 12/1989 European Pat. Off. .
0378154A1 7/1990 European Pat. Off. .

Primary Examiner—Paul J. Thibodeau
Assistant Examiner—H. Thi Le
Attorney, Agent, or Firm—Foley & Lardner

[57] ABSTRACT

Disclosed herein is a polyethylene terephthalate film for magnetic recording medium, which contains 0.1 to 1.0% by weight based on the film of aggregated silicon oxide particles having an average particle size of 0.03 to 0.2 μm, primary particle of which having an average particle size of 0.005 to 0.05 μm, 0.1 to 1.0% by weight based on the film of aggregated aluminium oxide particles having an average particle size of 0.03 to 0.2 μm, primary particle of which having an average particle size of 0.005 to 0.05 μm and 0.005 to 0.3% by weight based on the film of a crosslinked polymer having an average particle size of 0.2 to 0.8 μm, said film having a center line average surface roughness of 0.003 to 0.015 μm and a sum of F-5 values in both the machine direction and the transverse direction of at least 25.0 kg/mm$^2$. The film has a flat surface and is excellent in slipperiness, abrasion resistance, scratch resistance and protuberance resistance, which can be used as a base film for high-density magnetic recording medium.

10 Claims, No Drawings

POLYETHYLENE TEREPHTHALATE FILM FOR MAGNETIC RECORDING MEDIUM CONTAINING THREE DIFFERENT KINDS OF PARTICLES

FIELD OF THE INVENTION

The present invention relates to a polyethylene terephthalate film for a magnetic recording medium, which has a flat surface and is excellent in slipperiness, abrasion resistance, scratch resistance and protuberance resistance. More particularly, it relates to the polyethylene terephthalate film which can be used as a base film for high-density magnetic recording media.

BACKGROUND OF THE INVENTION

The polyethylene terephthalate films are excellent in physical and chemical properties, especially in flatness, mechanical strength and dimensional stability, if compares with other films, and therefore, they have been widely used as base films for magnetic recording media.

Recently, the miniaturization and the increase in recording density of the magnetic recording media including video tape has been rapidly made. Because the high-density magnetic recording is effective at short wavelength, the thickness of a magnetic layer in the high-density magnetic recording medium is reduced so as to improve an output loss due to the thicker magnetic layer. For example, a standard video tape has generally a magnetic layer of about 5 $\mu$m, while a high-density video tape where a metal powder, mainly a pure iron powder is applied has the magnetic layer of about 2 $\mu$m. With the reduction in thickness of the magnetic layer, the influence of surface properties of the base film on the electromagnetic properties of the magnetic recording medium becomes more larger. Therefore, the surface of the base film should be as flat as possible.

Until now, the improvement in flatness of the base film is usually accompanied by the damages of other properties such as slipperiness, abrasion resistance, scratch resistance and protuberance resistance were impaired. Using a base film having poor abrasion resistance, a white powder produced due to the friction and abrasion between the film and various rollers during preparing the tape. It inhibited the uniform application of the magnetic layer and was partly transferred on the surface of the magnetic layer, which caused a drop-out. The white powder also produced during a calendering step after applying the magnetic layer to the film so as to be made into the magnetic tape. Then, it deposited on a surface of a calendering roll, which gave the rough surface of the magnetic layer and caused the lowering in electromagnetic properties of the resultant magnetic tape.

It is known to incorporate inactive fine particles in the film so as to inhibit the production of the white powder and to improve the abrasion resistance. By incorporating such particles in an amount enough to obtain a satisfactory abrasion resistance, naturally the flatness of the film is damaged.

The protuberance resistance is one of the properties which are requested for the base film. The term "protuberance" means herein a phenomenon which, when the base film is wound under tension, causes a partly protuberance due to the inclusion of a dust or other contaminants as well as the carrying of the concomitant air produced by winding at high speed. When the base film protuberated, it deformed in the form of circular projection, which also caused the drop-out.

It is known to incorporate particles effective for the improvement of the slipperiness in the base film so as to inhibit the protuberance. By incorporating such particles in an amount enough to obtain a satisfactory protuberance resistance, naturally the flatness of the film is damaged.

With the miniaturization of a magnetic recording system, the reduction in thickness of the tape, i.e. the base film is also made. Because the base film having the reduced thickness is poor in mechanical strength, the film is generally subjected by stretching in machine direction or in both machine and transverse directions at high draw ratio so as to increase the mechanical strength. Such a film is generally called "a tensilized film". However, the tensilized film is easily scratched. Especially if has the flat surface, the production of scratch increases, which invites the lowering in output and causes the drop-out, when made into the magnetic tape. Therefore, the flat film which is hardly scratched could not be obtained. In addition, the tensilized film has the poor abrasion resistance. By stretching at high draw ratio, large void at the interfaces between the particles incorporated in the film and the film are formed, thereby the particles are easily dropped out and the white powder is easily produced during the calendering step.

An object of the present invention is to provide a base film for magnetic recording medium, which has a flat surface and is excellent in abrasion resistance, scratch resistance and protuberance resistance when made into the tensilized film.

SUMMARY OF THE INVENTION

The present invention provides a polyethylene terephthalate film for magnetic recording medium, which contains 0.1 to 1.0% by weight based on the film of aggregated silicon oxide particles having an average particle size of 0.03 to 0.2 $\mu$m, primary particle of which having an average particle size of 0.005 to 0.05 $\mu$m, 0.1 to 1.0% by weight based on the film of aggregated aluminium oxide particles having an average particle size of 0.03 to 0.2 $\mu$m, primary particle of which having an average particle size of 0.005 to 0.05 $\mu$m and 0.005 to 0.3% by weight based on the film of a crosslinked polymer having an average particle size of 0.2 to 0.8 $\mu$m, said film having a center line average surface roughness of 0.003 to 0.015 $\mu$m and a sum of F-5 values in both the machine direction and the transverse direction of at least 25.0 kg/mm$^2$.

DETAILED DESCRIPTION OF THE INVENTION

The term "polyethylene terephthalate" means herein that comprising ethylene terephthalate unit as a constitutional repeating unit. Generally, the polyethylene terephthalate can be obtained by copolymerizing terephthalic acid and/or its derivatives with ethylene glycol. The derivatives of terephthalic acid include lower ($C_1$-$C_4$) alkyl esters such as dimethyl terephthalate. A part of terephthalic acid and/or its derivatives may be replaced with other acid component, the examples of which include dicarboxylic acid such as isophthalic acid, phthalic acid, adipic acid and 2,6-naphthalene dicarboxylic acid, hydroxycarboxylic acid such as p-hydroxyethoxybenzoic acid, and their lower alkyl esters. Similarly, a part of ethylene glycol may be replaced with other glycol component, the examples of which include trimethylene glycol, tetramethylene glycol, hexamethylene glycol and 1,4-cyclohexanedimethanol.

The polyethylene terephthalate used in the present invention may contain suitable additives such as thermal stabilizer, anti-blocking agent, antioxidant, coloring agent, antistatic agent, ultraviolet absorber and the like.

As described in the above, the polyethylene terephthalate film of the present invention should contain 0.1 to 1.0% by weight based on the film of aggregated silicon oxide particles having an average particle size of 0.03 to 0.2 μm, 0.1 to 1.0% by weight based on the film of aggregated aluminium oxide particles having an average particle size of 0.03 to 0.2 μm and 0.005 to 0.3% by weight based on the film of a crosslinked polymer having an average particle size of 0.2 to 0.8 μm.

The average particle size of the primary particles of silicone and aluminium oxides which constitute the aggregated particles is 0.005 to 0.05 μm, preferably 0.008 to 0.05 μm. When it is less than 0.005 μm, the improvement in scratch resistance and protuberance resistance cannot be obtained. On the other hand, when it is above 0.05 μm, the flatness of the film is impaired. The average particle size of the aggregated particles of silicon and aluminium oxides is 0.03 to 0.2 μm, preferably 0.05 to 0.2 μm. The average particle size of the aggregated particles can be easily controlled by subjecting the coarse particles to conventional treatment such as pulverization, classification and filtration so as to remove coarse particles. When it is less than 0.03 μm, the improvement in scratch resistance and protuberance resistance cannot be obtained. On the other hand, when it is above 0.2 μm, the flatness of the film is impaired.

Each content of silicon and aluminium oxides particles is 0.1 to 1.0% by weight, preferably 0.2 to 0.5% by weight based on the film. When it is less than 0.1% by weight, the improvement in scratch resistance and protuberance resistance cannot be obtained. On the other hand, when it is above 1.0% by weight, the flatness of the film is impaired.

The polyethylene terephthalate film of the present invention contains the crosslinked polymer particles having an average particle size of 0.2 to 0.8 μm, together with the silicon and aluminium oxides particles. The shape of the crosslinked polymer particles is not restricted. Preferably the crosslinked polymer particles are substantially sphere, whose volumetric shape factor (f) defined by the following formula:

$$f = V/D^3$$

wherein V is the volume of particles (μm³) and

D is maximum particle size (μm) on projected plan, is 0.4 or more and have an uniform particle size distribution. More preferably, they can be suitably deformed by stretching.

The crosslinked polymer used in the present invention include a copolymer of a monovinyl compound having only one aliphatic unsaturated bond in the molecule such as (meth)acrylic acid, its alkyl ester, styrene and its alkyl ester with a compound having two or more aliphatic unsaturated bonds in the molecule and acting as a crosslinking agent such as divinylbenzene and ethylene glycol dimethacrylate, as described in Japanese Patent Publication 84-5216. The crosslinked polymer usable in the present invention is not limited to the above copolymers. For example, a thermosetting phenolic resin, a thermosetting epoxy resin, a thermosetting urea resin and a benzoguanamine resin can be also used in the present invention. Preferably, the crosslinked polymer has a group which can react with polyethylene terephthalate.

Among the above polymers, the crosslinked polymer having glass transition temperature (Tg) of 110° C. or less, especially 100° C. or less, more especially 90° C. or less is preferable, so as to obtain the easily deformable particles.

The crosslinking degree of the crosslinked polymer affects the ease in deformation of the particles. Preferably, it has low crosslinking degree, as long as the polymer has the acceptable heat resistance. Therefore, the ratio of the compound acting as the crosslinking agent, i.e. the compound having two or more aliphatic unsaturated bonds in the molecule, is preferably 5 to 20%, more preferably 7 to 15%.

The shape of the crosslinked polymer particles are not restricted. They may have a multilayer structure.

The method for preparing the crosslinked polymer particles is not restricted. For example, they are prepared by suspension polymerization followed by grinding and classifying. Alternatively, they are prepared by emulsion polymerization.

The content of the crosslinked polymer particles is 0.005 to 0.3% by weight, preferably 0.01 to 0.2% by weight based on the film. When it is less than 0.005% by weight, the improvement in abrasion resistance and protrubence resistance cannot be obtained. On the other hand, when it is above 0.3% by weight, the flatness of the film is impaired.

By incorporating the above three particles according to the present invention, the resultant film has the following advantages:

(1) the scratch caused by stretching the film in machine direction is very little, and (2) the voids formed at the interfaces between the particles and the film are very small and therefore, the drop-out of the particle is not observed.

The method for incorporating the particles in the polyethylene terephthalate is not restricted. For example, the particles may be added in any step during the preparation of polyethylene terephthalate, preferably after the esterification or ester interchange or before the polycondensation. The particles may be directly blended with polyethylene terephthalate chips.

For coexisting the three kinds of particles in the film, each kind of particles are added in polyethylene terephthalate followed by mixing each blend in a predetermined amount on preparing the film. Alternatively, the three kinds of particles in predetermined amount may be simultaneously in polyethylene terephthalate.

As mentioned in the above, the film of the present invention should have the center line average surface roughness (Ra) of 0.003 to 0.015 μm, preferably 0.005 to 0.012 μm and the sum of F-5 values in both the machine direction and the transverse direction of at least 25.0 kg/mm², preferably at least 27.0 kg/mm². When Ra is less than 0.003 μm, the film hardly manageable and processed. On the other hand, when it is above 0.015 μm, the output of the magnetic tape is largely lowered.

EXAMPLES

The present invention will be described in more detail with reference to the examples thereof, but it should be understood that the invention is not limited to these examples. In the following descriptions of the Examples and Comparative Examples, all "parts" and "%" are by weight unless otherwise noted.

The methods used for determining various properties in the following Examples and Comparative Examples are as follows.

PROPERTIES OF THE PARTICLES

(1) Average Particle Size

The particle sizes of the primary particles of aluminium and silicon oxides were determined by observing through a transmission electron microscope, before incorporating in polyethylene terephthalate. And, the particle sizes of the aggregated particles of aluminium and silicon oxides were determined by observing the section of the film through the transmission electron microscope.

The particle size of the crosslinked polymer particle was determined by observing through a transmission electron microscope, before incorporating in polyethylene terephthalate.

PROPERTIES OF THE FILM

(2) Center Line Average Surface Roughness

This was determined in accordance with JIS B0601-1976, using a surface roughness meter (model SE-3A) of Kosaka Kenkyusho Ltd. The determination was conducted at 12 points under the following conditions:
radius of stylus: 5 μm,
load of stylus: 30 mg,
cut-off value: 80 μm, and
determination length: 2.5 mm.
After the maximum and minimum values were excluded, the average of the determination values at 10 points was obtained.

(3) F-5 Value

The F-5 value was expressed by the stress (kg/mm$^2$) at 5% elongation. The stress was measured by elongating a test piece of 50 mm length and 15 mm width at the rate of 50 mm/min using an Insteco tensile tester (model 2001), at the temperature of 23° C. and the relative humidity of 50%.

(4) Scratch Resistance

This was determined by applying a white light to the stretched film. The degree of scratch on the surface of the film was visually observed and evaluated on the following criterion.
Rank A: No scratch was observed on the surface of the film.
Rank B: The scratches were observed on a part of the surface of the film.
Rank C: The scratches were observed on the whole surface of the film.

(5) Protuberance Resistance

When the film was wound, some amount of the particles having about 5 μm was added so as to cause protuberance on the surface of the film. Then, the number of turns until the protuberance was disappeared was counted.
Rank A: excellent
Rank B: good
Rank C: poor

(6) Abrasion Resistance

This was determined by using a 5-step minisuper calender comprising rolls of planished metal and rolls of polyester composite resin. The surface temperature of each roll was set to be 85° C. The film having a length of 500 m was let run 7 times through rolls at a linear pressure of 250 kg/cm and a running speed of 80 m/sec. The amount of worn-out white powder adhering on the resin roll was visually observed and evaluated on the following criterion.
Rank A: No adhesion of white powder was observed.
Rank B: The adhesion of a slight amount of white powder was observed.
Rank C: The adhesion of a significant amount of white powder was observed.

(7) Slipperiness

The slipperiness was expressed as a coefficient of dynamic friction. Firstly, two films, each of which had the width of 15 mm and the length of 150 mm, were superposed on a flat glass plates, on which a rubber plate and a load of 100 g were placed. Then, a friction force between the films was determined while moving the film at the running speed of 20 mm/min. From the determined value, a coefficient of dynamic friction was calculated.

PROPERTIES OF THE MAGNETIC TAPE

The magnetic tape used here was produced as follows.

200 Parts of fine magnetic powder, 30 parts of polyurethane resin, 10 parts of nitrocellulose, 10 parts of vinyl chloride-vinyl acetate copolymer, 5 parts of lecithin, 100 parts of cyclohexanone, 100 parts of methyl isobutyl ketone and 300 parts of methyl ethyl ketone were mixed and dispersed in a ball mill for 48 hours, followed by filtering and adding 5 parts of polyisocyanate compound to prepare a magnetic coating material. This coating material was coated on the polyethylene terephthalate film. The film was magnetically oriented before the coating material was sufficiently dried and solidified. Then the coat was dried to form a 2 μm thick magnetic layer. This coated film was subjected to a surface treatment by a supercallender and then slit into a ½ inch width to form a video tape.

(8) Electromagnetic Properties

The electromagnetic properties of the video tape were determined by using a video deck (model NV-3700) by Matsushita Electric Co., Ltd.

The VTR head output at a measuring frequency of 4 MHz was determined by a synchroscope. Blank was supposed to be 0 dB, and its relative value was shown in dB.

The number of dropouts at 15 μsec-20 dB was counted by a dropout counter made by Ohkura Industries Co., Ltd. The counted number was converted to the dropout per minute.

EXAMPLE 1

100 Parts of dimethyl terephthalate, 60 parts of ethylene glycol and 0.09 part of magnesium acetate tetrahydrate were heated in a reactor to evaporate away methanol and carry out an ester exchange reaction. The mixture was heated to 230° C. over 4 hours to substantially complete the ester exchange reaction. To the reaction mixture, were added 0.4% of ground, classified and filtered SiO$_2$ particles, followed by further addition of 0.04% of ethyl acid phosphate and 0.04% of antimony trioxide to carry out a polycondensation reaction for 4 hours to obtain a polyester (A).

Separately, a polyester (B) and a polyester (C) were obtained in the same procedures described in the above, except that in the polyester (B) 0.1% of $Al_2O_3$ particles were added in place of the $SiO_2$ particles and in the polyester (C) 0.3% of a crosslinked polymer particles were added in place of the $SiO_2$ particles. Further, a polyester (D) was obtained in the same procedures described in the above, except that no particle was present. The average particle size of the particles used were shown in Table 1.

Then, 50% of the polyester (A), 30% of the polyester (B), 10% of the polyester (C) and 10% of the polyester (D) were uniformly blended and after dried at 180° C., the mixture was extruded at 290° C. into a sheet and cooled by an electrostatic pining method to obtain an amorphous film having a thickness of 170 μm.

cles and those of the crosslinked polymer particles were changed as shown in Table 1.

The amorphous film was stretched 3.5 times in machine direction and 3.5 times in transverse direction, and further stretched 1.4 times in machine direction and 1.5 time in transverse direction to obtain a biaxially stretched polyester film having a thickness of 10 μm.

The resultant polyester film showed F-5 value in machine direction of 15.1 kg/mm$^2$ and F-5 value in transverse direction of 14.3 kg/mm$^2$, the sum of F-5 values being 29.4 kg/mm$^2$.

EXAMPLE 3 AND COMPARATIVE EXAMPLES 1 TO 3

A biaxially stretched film was obtained in the same procedures described in Example 1, except that the type and the amount of particles were changed as shown in Table 1.

TABLE 1

| | Properties of particles | | | | | | | | | Properties of film | |
|---|---|---|---|---|---|---|---|---|---|---|---|
| | Silicon oxide | | | Aluminum oxide | | | Crosslinked polymer | | | | Sum of F$_5$ values |
| | *1 (μm) | *2 (μm) | Amount (wt %) | *1 (μm) | *2 (μm) | Amount (wt %) | *3 (μm) | Amount (wt %) | Ra (μm) | (MD + TD) (kg/mm$^2$) |
| Example-1 | 0.03 | 0.11 | 0.20 | 0.02 | 0.08 | 0.30 | 0.5 | 0.030 | 0.008 | 28.1 |
| Example-2 | 0.03 | 0.11 | 0.30 | 0.02 | 0.08 | 0.30 | 0.7 | 0.010 | 0.010 | 29.4 |
| Example-3 | 0.04 | 0.12 | 0.20 | 0.03 | 0.10 | 0.30 | 0.6 | 0.015 | 0.009 | 30.2 |
| Comp. Example-1 | 0.16 | 0.75 | 0.20 | 0.02 | 0.08 | 0.30 | 0.7 | 0.010 | 0.017 | 26.0 |
| Comp. Example-2 | — | — | — | 0.02 | 0.08 | 0.30 | 0.6 | 0.015 | 0.007 | 29.8 |
| Comp. Example-3 | 0.04 | 0.12 | 0.20 | 0.02 | 0.08 | 0.30 | — | — | 0.007 | 29.5 |
| Comp. Example-4 | 0.03 | 0.11 | 0.05 | — | — | — | 0.6 | 0.010 | 0.006 | 28.7 |

| | Properties of film | | | | Properties of magnetic tape | |
|---|---|---|---|---|---|---|
| | Scratch resistance (rank) | Protubelance resistance (rank) | Abrasion resistance (rank) | *4 (coefficient of dinamic friction) | VTR head output (dB) | Number of drop outs (drop out/min) |
| Example-1 | A | A | A | 0.45 | +0.1 | 1.2 |
| Example-2 | A | A | A | 0.41 | 0.0 | 1.0 |
| Example-3 | A | A | A | 0.42 | +0.5 | 0.8 |
| Comp. Example-1 | A | A | A | 0.37 | −3.3 | 2.3 |
| Comp. Example-2 | B | A | B | 0.50 | −1.8 | 6.5 |
| Comp. Example-3 | A | C | C | 0.47 | −2.4 | 5.6 |
| Comp. Example-4 | C | A | B | 0.56 | −0.3 | 8.1 |

*1: Average particle size of primary particles
*2: Average particle size of aggregated particles
*3: Average particle size
*4: Slipperiness The amorphous film was stretched 4 times in machine direction and 4 times in transverse direction, and further stretched 1.2 times in machine direction to obtain a biaxially stretched polyester film having a thickness of 10 μm.

The biaxially stretched polyester film showed F-5 value in machine direction of 18.0 kg/mm$^2$ and F-5 value in transverse direction of 10.1 kg/mm$^2$, the sum of F-5 values being 28.1 kg/mm$^2$.

EXAMPLE 2

An amorphous film having a thickness of 170 μm was obtained in the same procedures described in Example 1, except that the type and the amount of the $SiO_2$ parti- In the polyester films obtained in Examples 1 to 3, the scratch was not substantially observed on the surface after restretching. When they were wound into rolls, the protuberance as well as the wrinkle were not substantially observed and therefore, the rolls had very good appearances. Each of the films showed low center line average surface roughness which is the suitable value for the high-density magnetic recording and therefore, the magnetic tape prepared therefrom had high electromagnetic properties. In addition, the film was excellent in abrasion resistance and slipperiness although it had low center line average surface roughness.

In the film obtained in Comparative Example 1 wherein the SiO₂ particles which had the particle sizes of the aggregated particles and the primary particles being out of the range defined in the present invention were used, its center line average surface roughness was higher. Therefore, the magnetic tape prepared therefrom had poor electromagnetic properties.

In the film obtained in Comparative Examples 2 and 4 wherein the SiO₂ particles or the Al₂O₃ particles were absent, the scratches were clearly observed on the surface. It had poor abrasion resistance and slipperiness. And, the magnetic tape prepared therefrom had poor electromagnetic properties with the significant drop-out rate.

In the film obtained in Comparative Example 3 wherein the crosslinked polymer particles were absent, many protuberances were observed when it was wound into a roll and the roll had irregular edges, which caused the lowering of a commercial value. The film had poor abrasion resistance and therefore, the magnetic tape prepared therefrom had poor electromagnetic properties with the significant drop-out rate.

As it is clear from these Examples and Comparative Examples, the polyethylene terephthalate film of the present invention is excellent in slipperiness, abrasion resistance, scratch resistance and protuberance resistance and these excellent properties can be maintained during and after the production of the magnetic tape. Therefore, it can be said that the polyethylene terephthalate film of the present invention is very valuable as the base film for high-density magnetic recording medium.

We claim:

1. A polyethylene terephthalate film for magnetic recording medium, which contains 0.1 to 1.0% by weight based on the film of aggregated silicon oxide particles having an average particle size of 0.03 to 0.2 $\mu$m, the primary particle of which has an average particle size of 0.005 to 0.05 $\mu$m, 0.1 to 1.0% by weight based on the film of aggregated aluminium oxide particles having an average particle size of 0.03 to 0.2 $\mu$m, the primary particle of which has an average particle size of 0.005 to 0.05 $\mu$m, and 0.005 to 0.3% by weight based on the film of a crosslinked polymer having an average particle size of 0.2 to 0.8 $\mu$m, said film having a center line average surface roughness of 0.003 to 0.015 $\mu$m and a sum of F-5 values in both the machine direction and the transverse direction of at least 25.0 kg/mm².

2. A film according to claim 1, wherein the silicon oxide particles are contained in an amount of 0.2 to 0.5% by weight.

3. A film according to claim 1, wherein the aluminium oxide particles are contained in an amount of 0.2 to 0.5% by weight.

4. A film according to claim 1, wherein the crosslinked polymer particles have a substantially spherical shape.

5. A film according to claim 1, wherein the crosslinked polymer particles are particles of a polymer having a glass transition temperature of 110° C. or less.

6. The film of claim 1 in which the crosslinked polymer has an average particle size of 0.5 to 0.8 $\mu$m.

7. The film of claim 1 in which the crosslinked polymer has an average particle size of 0.6 to 0.8 $\mu$m.

8. The film of claim 1 in which the aggregated aluminum oxide particles have an average particle size of 0.03 to 0.10 $\mu$m.

9. The film of claim 1 in which the aggregated aluminum oxide particles have an average particle size of 0.03 to 0.08 $\mu$m.

10. The film of claim 1 in which the aggregated silicon oxide particles have an average particle size of 0.03 to 0.12 $\mu$m.

* * * * *